Sept. 22, 1942.  B. E. CARL  2,296,422
APPARATUS FOR TREATING METALLIC OXIDES
Filed June 29, 1940  2 Sheets-Sheet 1
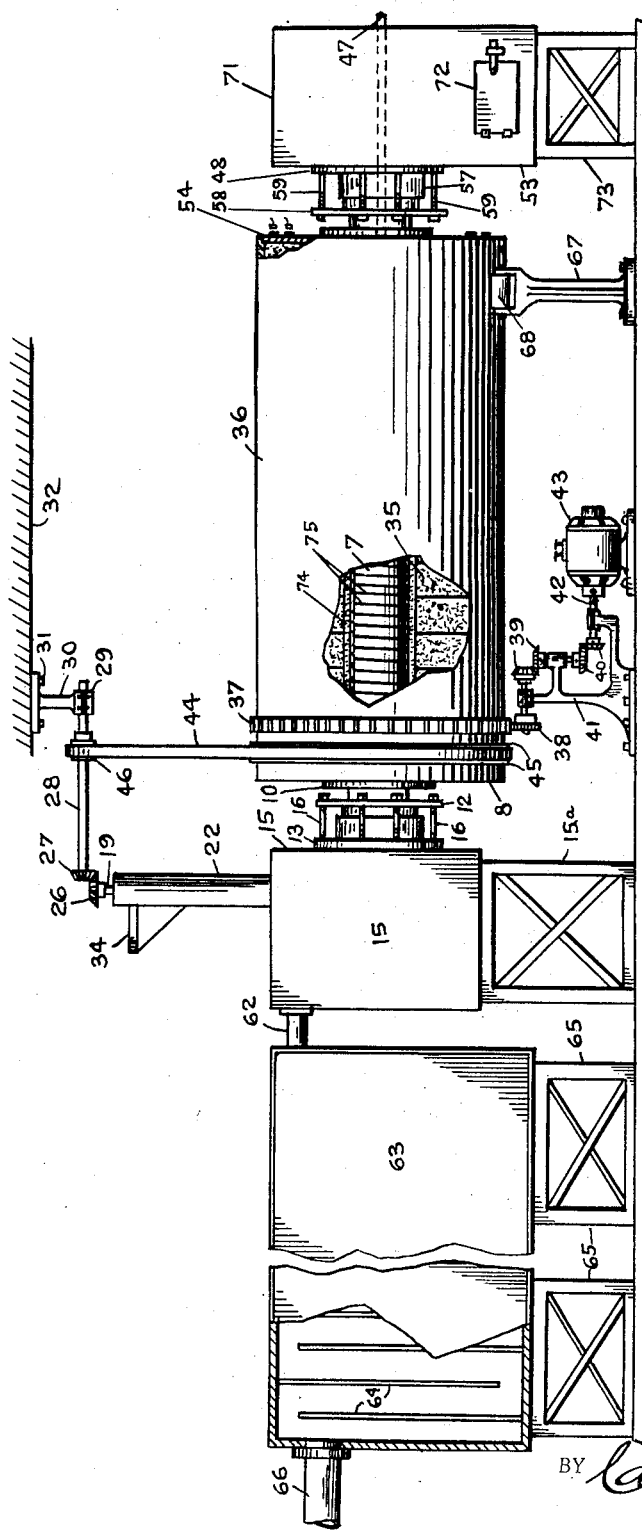

Sept. 22, 1942. B. E. CARL 2,296,422
APPARATUS FOR TREATING METALLIC OXIDES
Filed June 29, 1940 2 Sheets-Sheet 2
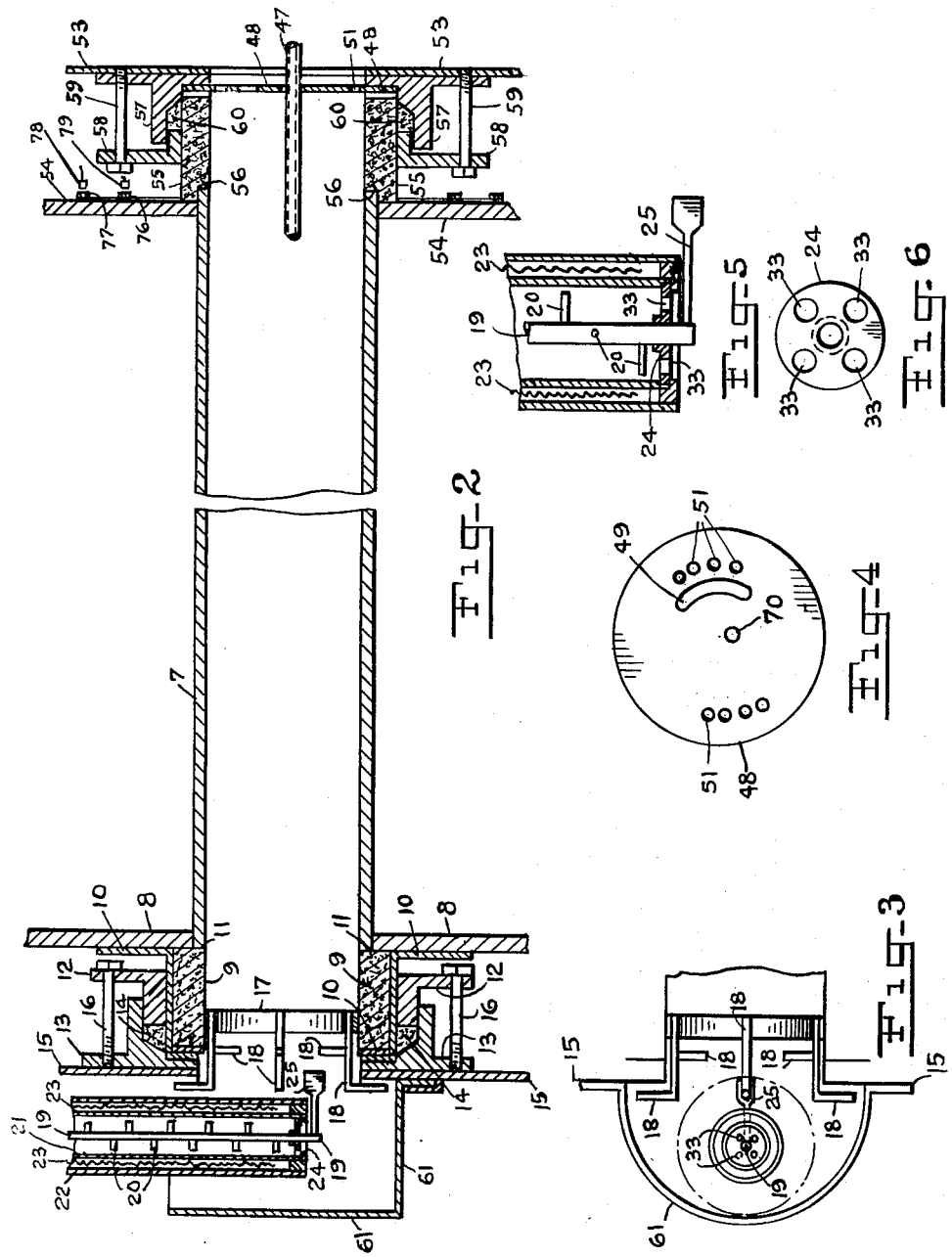

Patented Sept. 22, 1942

2,296,422

UNITED STATES PATENT OFFICE 2,296,422

APPARATUS FOR TREATING METALLIC OXIDES

Byron E. Carl, Portland, Oreg.

Application June 29, 1940, Serial No. 343,079

6 Claims. (Cl. 266—18)

My apparatus relates to the treatment of metallic oxides and its novelty consists in the adaptation and arrangement of parts as will be more fully hereinafter pointed out.

There are tremendous deposits of low grade metallic oxides found in the northwest part of the United States as well as elsewhere which, because of the cost of recovery, have been non-available.

My apparatus is adapted to effect the complete recovery of such metallic oxides from the native ore where found at a cost which makes the recovered metals compete for the first time with the regular processes of reducing such ores from high grade deposits.

My apparatus is particularly adapted for doing this continuously and efficiently so as to reduce the cost of the operation to a point where for the first time the treatment of such low grade ore is practicable.

In carrying out treatments by my apparatus I treat the metallic oxides some of which are volatile and some of which are relatively volatile such as chromite, magnesium oxide, iron oxide, aluminum oxide, tungsten, titanium, manganese, vanadium, molybdenum and aluminum sulphite and rare earth metal oxides as follows:

First I grind the ore to a fine mesh between 80 and 400; second I beneficiate, that is concentrate the ore by removing all of the undesired material, which may be done by air blowing or by any of the other standard practices; third I calcine it to drive off all moisture and more particularly the water of combination or crystallization; fourth I mix the concentrates with at least sufficient carbon to satisfy the oxygen in the ore, and this is intimately mixed for efficient contact with chlorine or any suitable compound of chlorine such as aluminum chloride, sulphur chloride, silicon tetra-chloride, carbon tetra-chloride or hydrochloric acid; fifth I preheat this mixture to the required temperature and maintain it at the required volatilization temperature of the gases formed and feed this solid preheated mixture into one end of a continuously revolving tube (more fully hereinafter described) and the chlorine compound into the opposite end of said tube which is inert and impervious to the gases used and evolved in a manner regulated so as to avoid an excess of the quantity required for the reaction and thereby contacting the solid material with said gases and volatilizing the resulting products and fractionally condensing said products. In this operation the chlorine is collected to be re-used in further chloridizing.

Referring to the drawings

Figure 1 is a front elevation of the complete apparatus for carrying out said process with certain portions broken for convenience in illustration and other portions cut away in order to show the interior construction.

Figure 2 is a vertical section of the reaction tube mountings and connections broken away for convenience in illustration.

Figure 3 is a top plan view of the feeding end of said reaction tube shown in Figure 2.

Figure 4 is a top plan view of the plate controlling the discharge end of said reaction tube of Figure 2.

Figure 5 is a detail enlargement of the lower end of the solid feeding device as shown in Figure 2.

Figure 6 is a top plan view of the feeding control plate in the bottom of the solid feeding device shown in Figure 5.

In the drawings 7 is a "Vitreosil" (or other material inert and impervious to the gases present) reaction tube which is mounted in a suitable framework at each end so as to rotate at the desired speed without danger of breaking or cracking and so that the material to be treated can be continuously handled with the gases used and developed being imperviously contained and conducted. This framework comprises at the feed end of said tube 7 a transit board 8, a packing 9 of asbestos graphite and cement and bearing plates 10 are mounted thereover. This packing 9 is inert and impervious to the gases present in the tube 7 during the entire process and also is particularly adapted to effect a perfect seal for the edge of the tube 7 at 11.

Mounted over the bearing plate 10 are the packing glands 12 and 13 which have a suitable packing of asbestos and graphite 14 between them and which are rigidly secured to the side of a hot box 15 by means of bolts 16.

At the feed end of the tube 7 in the packing 9 is mounted a ring 17 having outwardly turned fingers 18 made integral therewith and said ring 17 and the fingers 18 rotating with said tube 7 and its mountings.

19 is a rabble shaft having rabbles 20 rigidly and horizontally mounted thereon and rotating therewith, said shaft 19 being mounted in the inner solid feed tube 21 which has an outer tube 22 mounted thereover with a space between in which is mounted a resistance wire 23 for effecting the heating of the said solid feed tube and which is connected to a source of current not shown.

The lower end of the shaft 19 passes through a plate 24 which is rigidly mounted in the bottom of the solid feed tube 21 and which has openings 33 therein and the lower end of said shaft 19 has a paddle 25 rigidly secured thereto so as to rotate with said shaft 19. The upper end of said shaft 19 has a bevel gear 26 rigidly secured thereto which is adapted to mesh with bevel gear 27 of shaft 28 supported at its outer end in a bearing 29 constituting the lower end of bracket 30 which is rigidly secured at 31 to a wall 32.

On the upper end of the feed tube 22 is rigidly secured a feed chute 34 opening into the inner tube 21 so that solid feed dumped into 34 will pass into the inner tube 21.

Over the tube 7 is mounted a coating of asbestos cement 74 with a resistance coil 75 embedded therein around the tube 7 and a casing tube 36 to which is secured at either end transit boards 8 and 54 and fireproof wedge shaped fire brick 35 are forced into place in said tube 36 so as to insulate the tube 7 so as to enable the temperature desired to be attained and maintained in the tube 7. On the exterior of the transit board 54 are mounted two circular contact rings 76 and 77 connected to opposite ends of said resistance coil 75 and contactors 78 and 79 from a source of power not shown continuously contact said contact rings 76 and 77.

Adjacent the feed end of said tube 36 is a driven gear 37 entirely surrounding said tube 36 and rigidly mounted thereon which is engaged by the driving gear 38 which through crown gears 39 and 40 rotatably mounted on frame 41 are driven from the shaft 42 of an electrical motor 43 of usual construction and which is adapted to be connected to a source of power (not shown) in the usual well known manner. A belt 44 is adapted to pass around the tube 36 in the channel formed by the ridges 45 rigidly secured around the said tube 36 and passing over a pulley 46 rigidly secured to the shaft 28 so that as the tube 36 is driven by means of the motor 43 through shaft 42 and gears 40, 39, 38 and 37 said belt 44 will be also driven thereby, whereby through pulley 46 shaft 28 will be driven and thereby through gears 27 and 26 rabble shaft 19 will be constantly driven at a fixed ratio of speed to that of said tube 36 and the tube 7 contained therein. Chlorine or any suitable compound of chlorine will be fed as described through the tube 47 from a source not shown in this drawing, thereby passing into the tube 7 in a contracurrent against the flow of the metallic solid matter being fed into the feed chute 34 which passes down through the rabble 19 and which by the rotating paddle 25 and the rotating fingers 18 will keep the solid matter fed broken up and accessible to the solid feed end of the tube 7 so as to gradually feed thereinto as the tube may require.

Adjacent to the solid discharge end of the tube 7 is rigidly mounted to solid spill box 71 a plate 48 having an arcuate spill slot 49 adapted to be regulated as to its radial position by means of changing the two screws in the two series of screw holes 51 in order to maintain the arcuate slot 49 at the desired height to properly regulate the level of the solid material in the tube 7.

The discharge end of the tube 7, the same as the main portion, is also covered by the tube 36 and a transit board 54 passes around the tube 7 and an asbestos graphite cement compound packing 55 abuts the edge 56 of the tube 7 forming the suitable gas tight packing therefor and packing glands 57 and 58 are rigidly held in position by means of bolts 59 rigidly secured to the inner end 53 of the spill box 71 with gas tight graphite asbestos packing 60 therebetween. Said spill box 71 has a clean out door 72 and is rigidly supported on a stand 73.

Surrounding the lower end of the rabble feed 19 and the feed end of the tube 7 is a solid feed holder or plate 61 which is rigidly secured to the inside of the hot box 15, which hot box 15 is supported on a suitable stand 15A. From the upper outer end of the hot box 15 there passes a tube 62 leading into a condensation chamber 63 which has a series of staggered circulation plates 64 adapted to secure the varying temperatures required for proper condensation in said condensation box 63 and the said box 63 is supported on suitable stands 65. A pipe or tube 66 is connected from the interior of the condensation box 63 to a chamber for any further separation of the gases as may be desired which are not shown on the drawings for convenience in illustration.

Solid feed waste end of the tube 36 is supported by means of suitable standards 67 and roller bearings 68 and the chlorine feed pipe 47 passes therethrough and tube 7 is connected directly into said spill box 71 as described.

In carrying out the use of my apparatus the ore to be treated is first ground to a fine mesh then concentrated by removing all of the undesired material by any of the well known standard practices such as air blowing and then calcined to drive off all moisture and more particularly the water of combination or crystallization. The concentrates are then thoroughly mixed with sufficient carbon to satisfy the oxygen in the ore and this mixture is sufficiently mixed to insure efficient contact with the chlorine or other suitable compound of chlorine as may be used. This thoroughly mixed compound is then preheated to the temperature required for effectively carrying out the reaction sought and then fed immediately into the feed chute 34 and as the motor 43 has already been set in motion the shaft 42, gears 40, 39, 38, will be thereby driven so as to drive the driven gear 37 thereby rotating the tube 36 and the tube 7 carried therein. The belt 44 also will be driven from the belt slot 45 through the rotation of the tube 36 whereby pulley 46 will be driven and shaft 28, gears 27 and 26 whereby the rabble shaft 19 and the rabbles 20 carried thereby will be rotated uniformly at desired ratio of speed with the tubes 36 and 7. A regulated supply of chlorine or chlorine compound will then be allowed to flow through the tube 47 from its regulated source of supply (not shown) and the preheated solid compound fed down through the heated feed tube 21 will by means of rabbles 20 gradually be fed through the openings 33 in the bottom of the feed tube plate 24 so as to build up on the feed holder or plate 61 so that as the rotating paddle 25 rotating with shaft 19 revolves said solid compound will be gradually placed within reach of fingers 18 of the ring 17 which constantly break up said solid compound feed but catch some of it gradually so as to feed it onto the open end of the revolving tube 7 wherein it will be constantly rotated and tumbled further into tube 7 and exposed and reexposed to the action of chlorine or chlorine compound passing through in the opposite direction in the tube 7. Said solid compound feed will gradually build up in the tube 7 so as to maintain said tube 7 at the desired fullness to insure the complete exposure of all of the compound feed to the action of the chlorine or other chlorine compound so as to insure the complete volatilization of the metallic products sought which will pass off with the pressure of the line of the gases into the hot box 15, said gases will pass thence through tube 62 into the condensation chamber 63 whereby the various desired elements will be condensed at the varying temperatures maintained in the different compartments formed by the staggered circulation plates 64 and certain of the volatilized elements being further carried off through pipe 66 into further condensation chambers as may be desired. A clean out door of usual construction is mounted on the further side of 63.

Throughout this operation the temperature of the preheated solid compound will be maintained in the feed chamber 21 by means of the heating elements 23 and in the feed holder 61 which is contained within the hot box 15 and also the temperature in the reaction tube 7 will be attained and maintained by means of resistance coil 75 combined with the complete insulation of said tube 7.

Throughout the operation of my device the solid compound in the tube 7 will be maintained at the height desired so as to insure the complete exposure of all of the solid compound to the gases present in the tube 7 and prevent their passing through too rapidly by means of the regulation of the position of the arcuate spill slot 49 regulated by the manual adjustment of the two screws in screw holes 51.

It is particularly pointed out that the paddle 25 is, together with the fingers 18, a definite means for keeping the solid compound thoroughly broken up at all times to insure its being taken into the tube 7, as it revolves, gradually and in a finely divided state so as to insure its complete exposure to the chlorine or other compound passing slowly through the rotating tube 7 whereby the solid compound is insured a steady but gradual feeding into the revolving tube 7 to avoid a too rapid passing through of said solid compound in said tube 7 and insuring in the continuous rotating and tumbling of the solid compound the complete exposure and reexposure to the gases present, thereby insuring a complete reaction as to all parts of the solid compound. The action of the feeding mechanism for the solid compound is such that the solid compound is always slowly approaching the edge of the rotating tube 7 and the rotating tube 7 thereby gradually picks up the solid compound feeding it through the tube 7 only in a very gradual but continuous manner.

It is also to be noted that my device is so constructed that the revolving tube 7 of Vitreosil or other fused silica is inert and impervious to the gases present in the reaction described and is gas tight through the gas tight packings 9 and 55 at the contacting ends of the tube 7 at 11 and 56 and the packings 14 and 60 whereby leakage or seepage are prevented and the reaction is carried out completely and efficiently.

As surplus waste solid material is accumulated gradually in the spill box 71 it can be readily removed therefrom without disturbing or interrupting the operation of my device by opening the clean out door 72 and removing said waste solid material.

I claim:

1. In an apparatus for recovering the metal from metallic oxides, a rotating heated insulated reaction tube of fused silica adapted to maintain a predetermined substantially uniform level of solid materials throughout its entire length and a solid feeding and heating mechanism at one end of said tube rotating in unison therewith and adapted to maintain the temperature of material which has been preheated at a point high enough to prevent the exiting gases passing over it from condensing and commingling therewith to avoid gumming and feed stoppages and also keep it constantly and finely broken up and mixed and feed said solid material slowly and evenly to insure complete exposure and reaction, a feeding device adapted to feed a regulated counter current of chlorine compound to said reaction tube at the opposite end of said tube a heated spill box connected with the exit end of said reaction tube to collect and release non-volatile chlorides, such as magnesium chloride, and separate them from the volatile chlorides, a hot box interposed between said reaction tube and condensation chambers to maintain temperatures of the volatilizing chlorides above their liquifying or solidifying points and said fractional condensation chambers being attached to and interiorly connected with said hot box and tube so that in said chambers the exiting volatile metallic chlorides are separately condensed according to their liquifying or solidifying points and so that any one of them may be selectively removed in a relatively pure form adapted for subsequent reduction to a metal by any industrial processes well known to the chemical and metallurgical arts.

2. In an apparatus for recovering the metal from aluminum sulphite, a rotating insulated reaction tube impervious to the gases used and evolved mounted in suitable gas tight packings having a solid feed mechanism operating in unison with said reaction tube at one end of same and adapted to keep said solid material broken up and constantly and slowly presented to the open end of said revolving tube equipped with pick up fingers to gradually feed said solid material into said tube; adjustable means for regulating the level of said solid feed in said tube, vertically adjustable feeding means operating in sequence with an arcuate orifice plate positioned on the spill box at the opposite end of said tube to maintain the material throughout said tube at a substantially uniform level, means for feeding a regulated counter current of chlorine into said reaction tube at the end opposite said solid feed, means for maintaining the heat of solid material which has been preheated at or above the temperature of the gases evolved, a spill box connected with the exit end of said reaction tube to collect and release nonvolatile chlorides and separate them from the volatile chlorides, a hot box interposed between said reaction tube and condensation chambers to maintain temperatures of the volatilizing chlorides above their liquifying or solidifying points and said fractional condensation chambers attached to and internally connected with said hot box and tube so that in said chambers the exiting volatile metallic chlorides are separately condensed according to their liquifying or solidifying points and so that any one of them may be selectively removed in a relatively pure form adapted for subsequent reduction to a metallic compound by any industrial processes well known to the chemical and metallurgical arts.

3. In an apparatus adapted for recovering the metal from metallic oxides, a rotating heated insulated reaction tube impervious to the gases used and evolved mounted so as to rotate freely in gas tight packings, an electric motor connecting a series of driving gears the last of which meshes with and drives a driven gear mounted around the insulating tube carrying said reaction tube, a belt driven from said insulating tube and through a pulley shaft and gear driving a driven gear in a rabble feeding device uniformly with said reaction tube for solid feed which has been previously preheated, further adjustable means for keeping the solid feed broken up while slowly feeding to pick up fingers on the adjacent open end of said reaction tube, a regulated chlorine feeding device feeding into said reaction tube from the opposite end from said solid feed, means for maintaining a substantially uniform height of the solid feed in said tube, a hot box encasing said solid feed and connections, a connection from said hot box to a condensation box of varying condensation temperatures.

4. In an apparatus for recovering the metal from metallic oxides and aluminum sulphite, a rotating heated insulated reaction tube of fused silica having an adjustable opening at its exit end for maintaining a fixed substantially uniform level of solid material throughout its length, a solid feeding mechanism at the receiving end of said tube rotating in unison with said reaction tube and comprising a heated rabble driven by belt pulley shaft and gear connections from a belt slot around the outer rotating tube, a rotating paddle on the lower end of said rabble, a series of cutting and breaking up fingers adjacent to the feed end of said reaction tube and a feed plate, from which said solid material is thereby fed slowly and uniformly by a rotating paddle all contained within a hot box adjacent said feed end of said reaction tube adapted to maintain the temperature of said preheated material and keep it constantly and finely broken up so as to feed uniformly and slowly, a feeding device adapted to feed a regulated counter current of chlorine compound into the exit end of said reaction tube, a solid waste spill box connected to said exit end and a fractional condensation chamber adjoining said solid feed device.

5. In an apparatus adapted for recovering the metal from metallic oxides, a rotating heated insulated reaction tube impervious to the gases used and evolved mounted so as to rotate freely in gas tight packings, a source of power connected to a series of driving gears the last of which meshes with and drives a driven gear mounted around the insulating tube carrying said reaction tube, a belt driven from said insulating tube and through a pulley shaft and gear driving a driven gear in a rabble feeding device for solid feed which has been previously preheated, means rotating at a uniform speed with said reaction tube for keeping the solid compound feed broken up while slowly and uniformly feeding to said reaction tube comprising a rotating paddle mounted on the lower end of the rabble shaft and a ring having a series of outwardly extending fingers mounted immediately adjacent the reaction tube and said rotating paddle, a regulated chlorine feeding device feeding into said reaction tube from the opposite end from said solid feed, adjustable means for maintaining a substantially uniform height of the solid feed in said tube, a hot box encasing said solid feed and connections, a connection from said hot box to a condensation box of varying condensation temperatures and a connection to a further condensing medium.

6. In an apparatus for recovering the metal from metallic oxides including rare earth metal oxides and aluminum sulphite, a rotating insulated reaction tube impervious to the gases used and evolved mounted in suitable gas tight adjustable packings, means for maintaining a vertically adjustable feeding mechanism operating in sequence with an arcuate orifice plate positioned on the spill box at the opposite end of said tube for regulating the level of said solid feed in said tube, a solid feeding mechanism at one end adapted to maintain the temperature of said material at a point high enough to prevent the exiting gases passing over it from condensing and commingling therewith to avoid gumming and feed stoppages and adapted to maintain a uniform rotating speed or solid feed with said reaction tube and also keep said solid material broken up and constantly and slowly presented to the open end of said revolving tube; means for feeding a regulated counter current of chlorine compound to said reaction tube at the opposite end of said tube, a spill box connected with the exit end of said reaction tube to collect and release non-volatile chlorides and separate them from the volatile chlorides, a hot box interposed between said reaction tube and condensation chambers to maintain temperatures of the volatilizing chlorides above their liquifying or solidifying points and combined with fractional condensation chambers attached to and interiorly connected with said hot box and tube so that in said chambers the exiting volatile metallic chlorides are separately condensed according to their liquifying or solidifying points and so that any one of them may be selectively removed in a relatively pure form adapted for subsequent reduction to a metallic compound by any industrial processes well known to the chemical and metallurgical arts.

BYRON E. CARL.